United States Patent [19]

Ohtake

[11] Patent Number: 5,764,426
[45] Date of Patent: Jun. 9, 1998

[54] VARIABLE FOCAL LENGTH OPTICAL SYSTEM

[75] Inventor: Motoyuki Ohtake, Kawasaki, Japan

[73] Assignee: Nikon Corporation, Tokyo, Japan

[21] Appl. No.: 715,637

[22] Filed: Sep. 18, 1996

[30] Foreign Application Priority Data

Oct. 23, 1995 [JP] Japan ................... 7-274522

[51] Int. Cl.$^6$ .............. G02B 9/04; G02B 13/02
[52] U.S. Cl. ........................... 359/793; 359/748
[58] Field of Search ................. 359/686, 689, 359/691, 747, 748, 753, 781, 782, 784, 786, 787, 788, 793

[56] References Cited

U.S. PATENT DOCUMENTS

| | | | |
|---|---|---|---|
| 5,253,114 | 10/1993 | Lee et al. | 359/689 |
| 5,289,317 | 2/1994 | Ikemori et al. | 359/689 |
| 5,371,631 | 12/1994 | Takada | 359/689 |
| 5,574,599 | 11/1996 | Hoshi et al. | 359/689 |
| 5,652,678 | 7/1997 | Suzuki et al. | 359/557 |

FOREIGN PATENT DOCUMENTS

| | | |
|---|---|---|
| 57-73715 | 5/1982 | Japan. |
| 60-122917 | 7/1985 | Japan. |
| 61-129613 | 6/1986 | Japan. |
| 6-230280 | 8/1994 | Japan. |

*Primary Examiner*—Frank G. Font
*Assistant Examiner*—Michael P. Stafira
*Attorney, Agent, or Firm*—Shapiro and Shapiro

[57] ABSTRACT

A variable focal length optical system includes, in the following order from an object side, a first lens unit having a negative refractive power and a second lens unit having a positive refractive power, wherein the focal length of an entire lens system changes when a distance between the first lens unit and the second lens unit is changed, and the following condition is satisfied:

$$0.3 < f2/|f1| < 0.5$$

where f1 is the focal length of the first lens unit, and f2 is the focal length of the second lens unit.

16 Claims, 15 Drawing Sheets

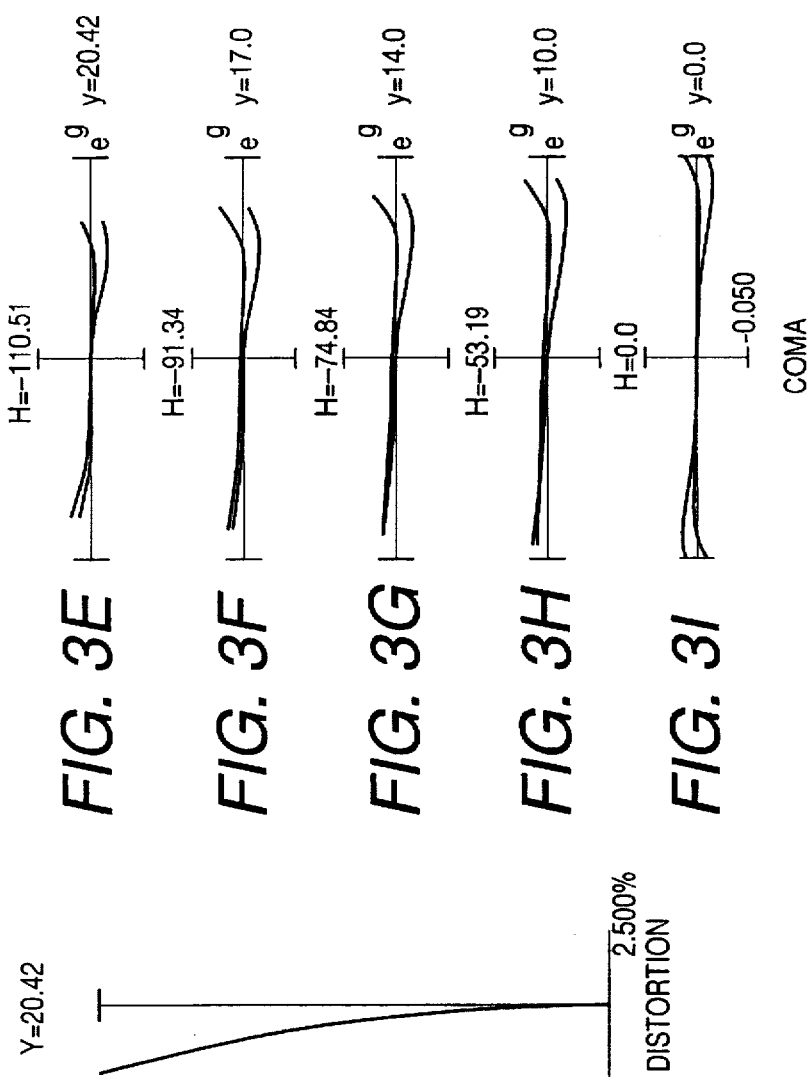
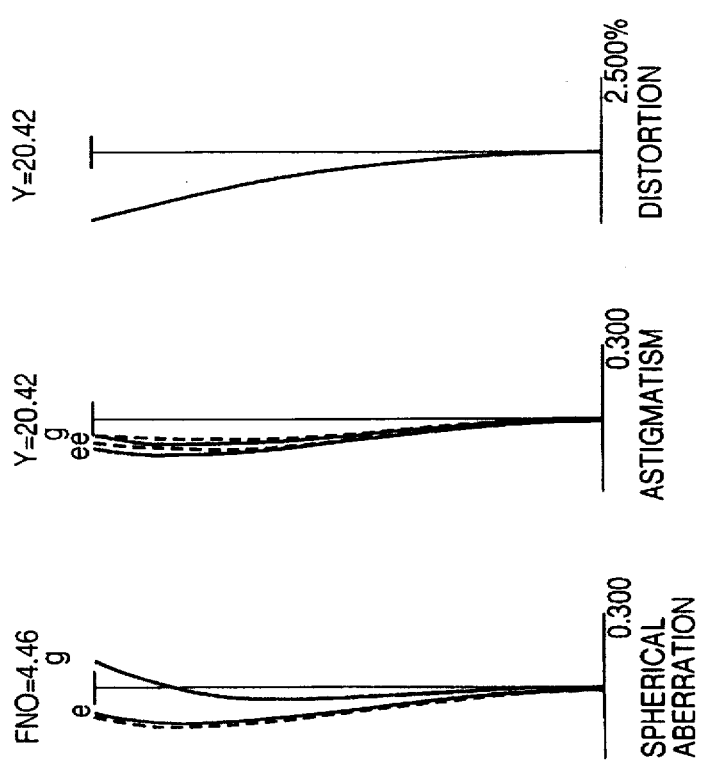

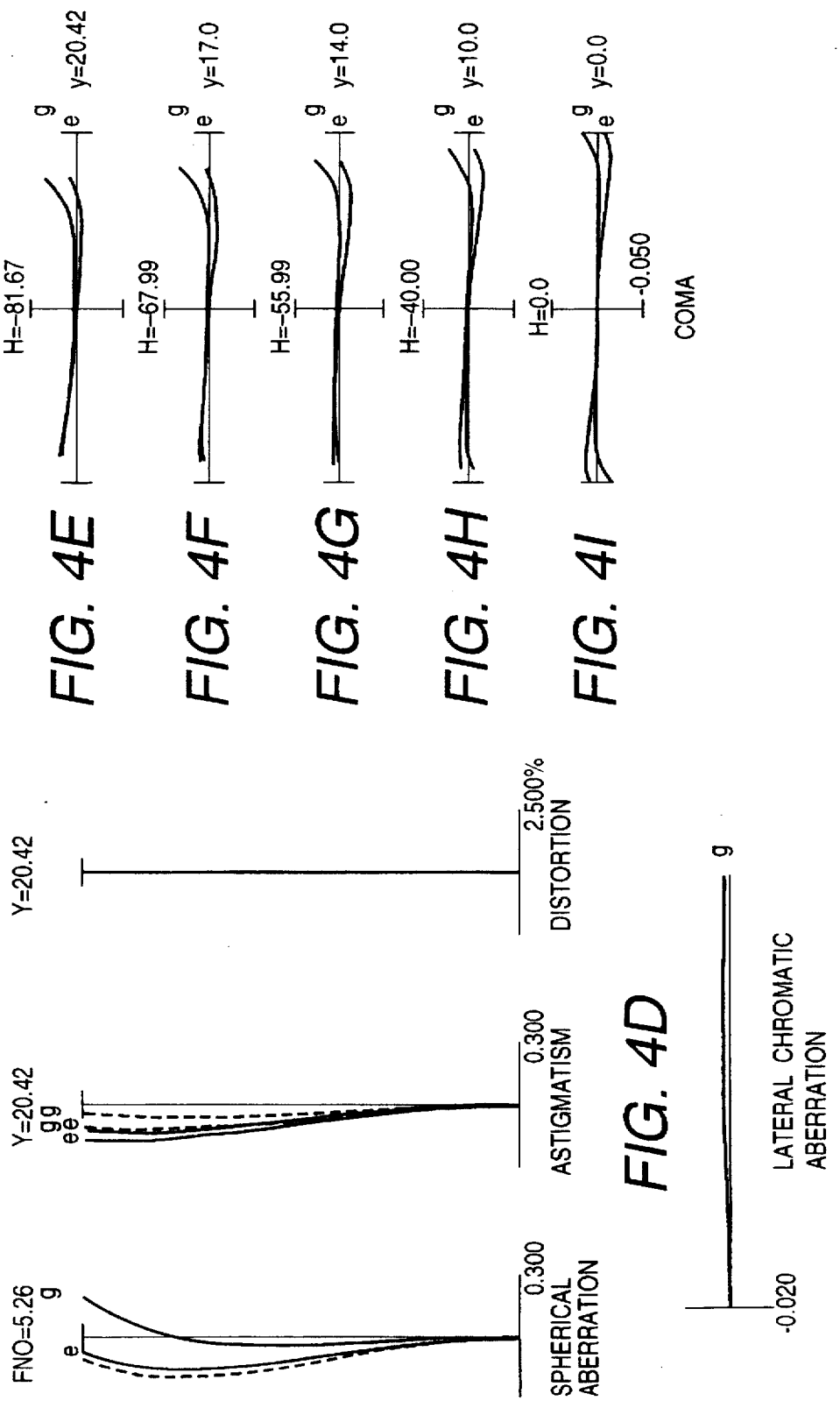

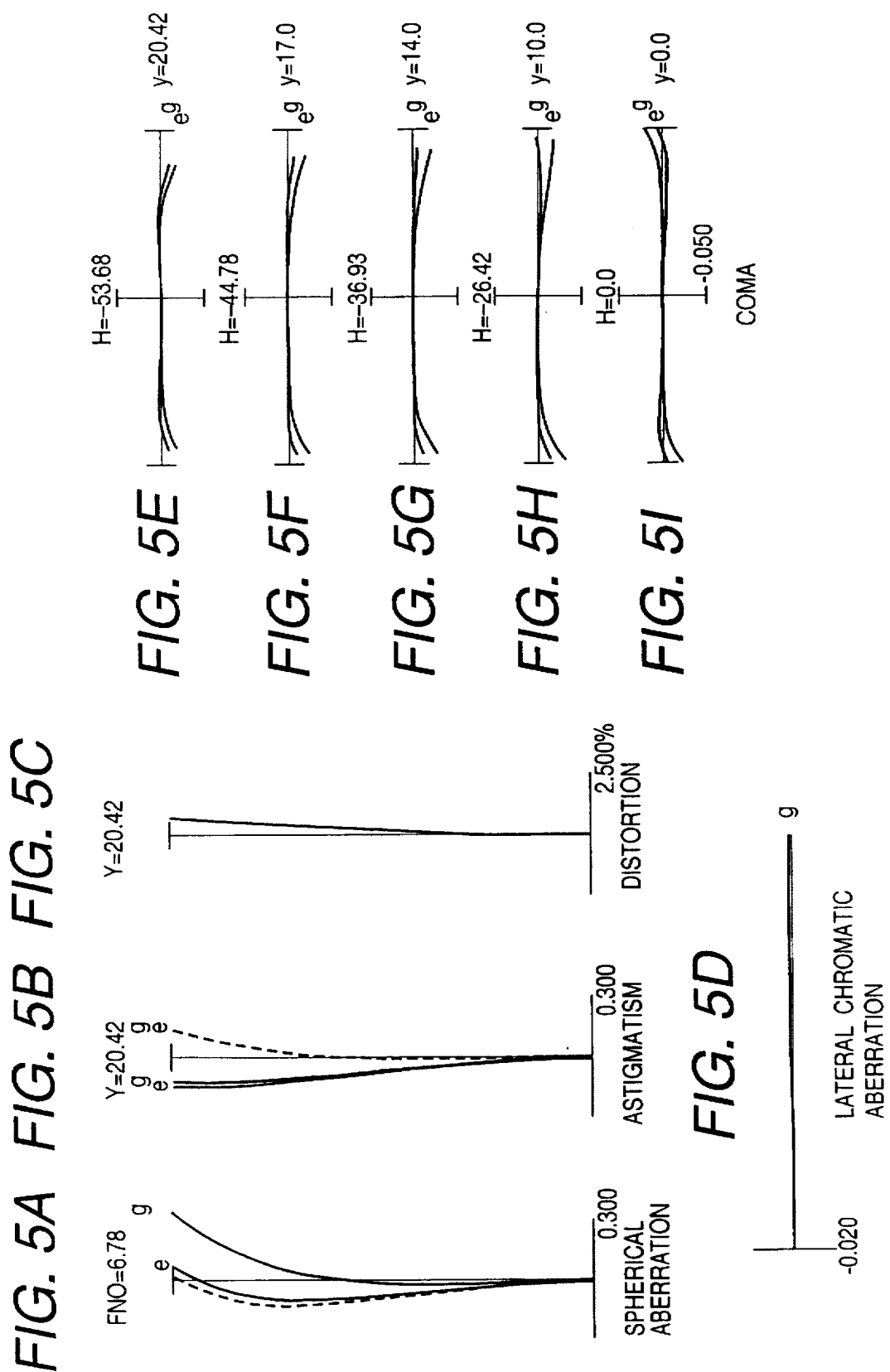

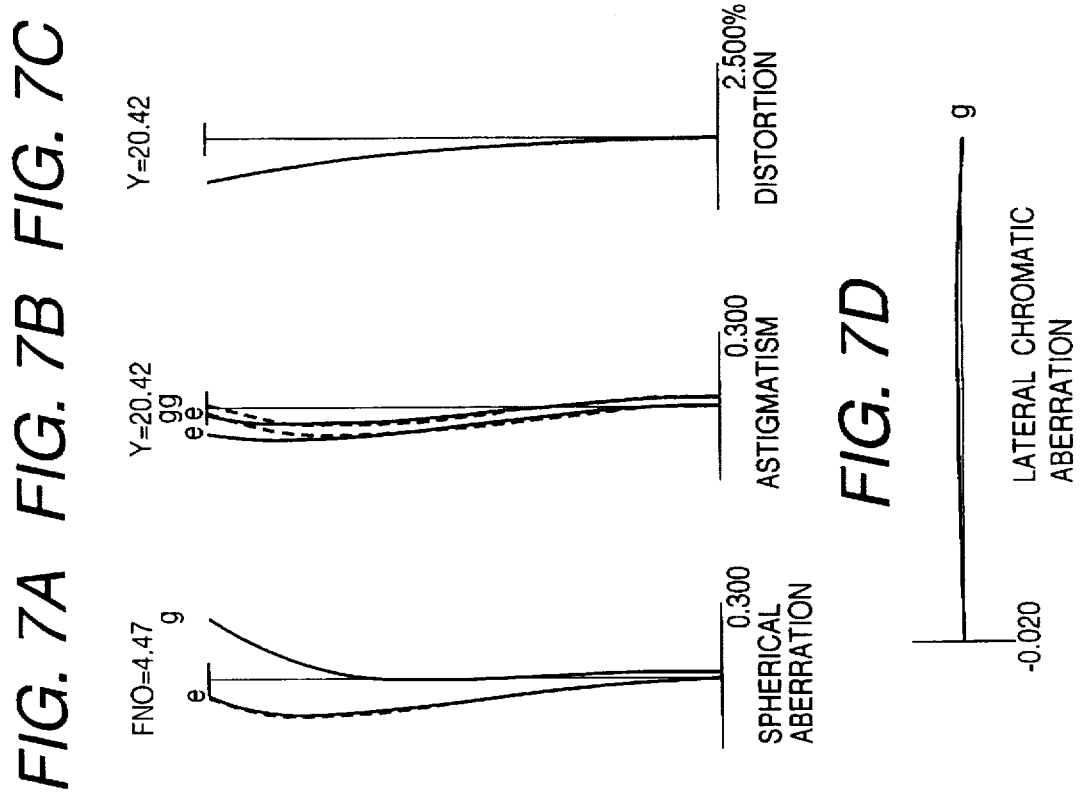

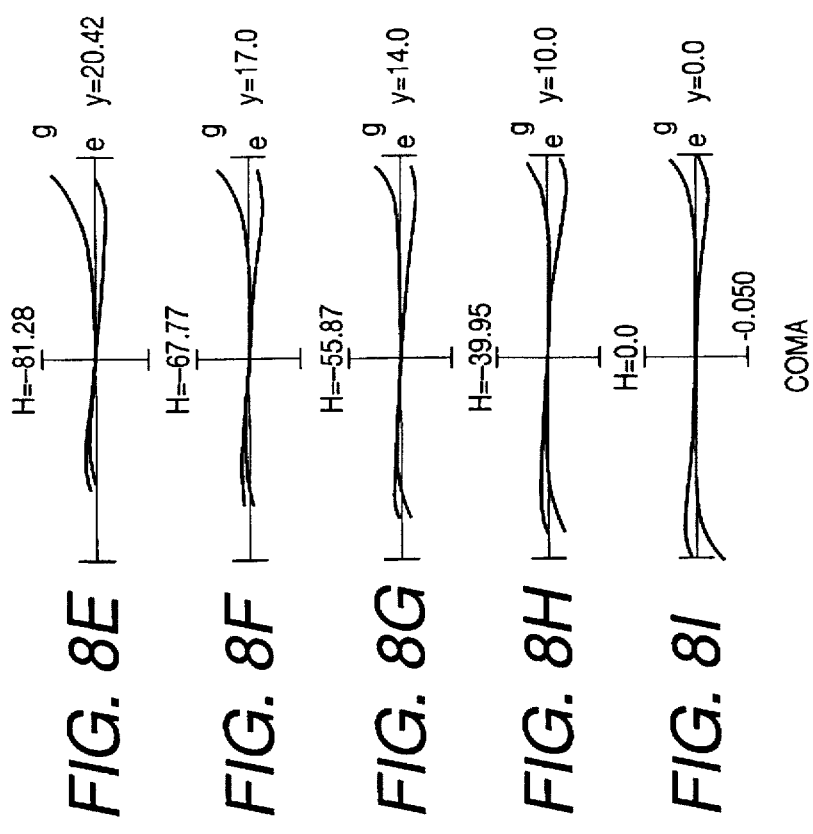
FIG. 8A  FIG. 8B  FIG. 8C
FIG. 8D
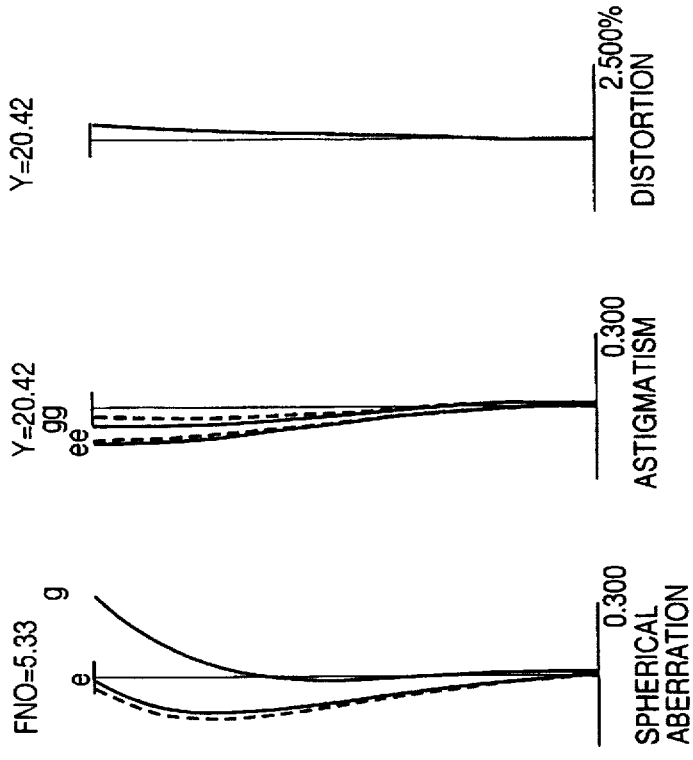
FIG. 8E
FIG. 8F
FIG. 8G
FIG. 8H
FIG. 8I

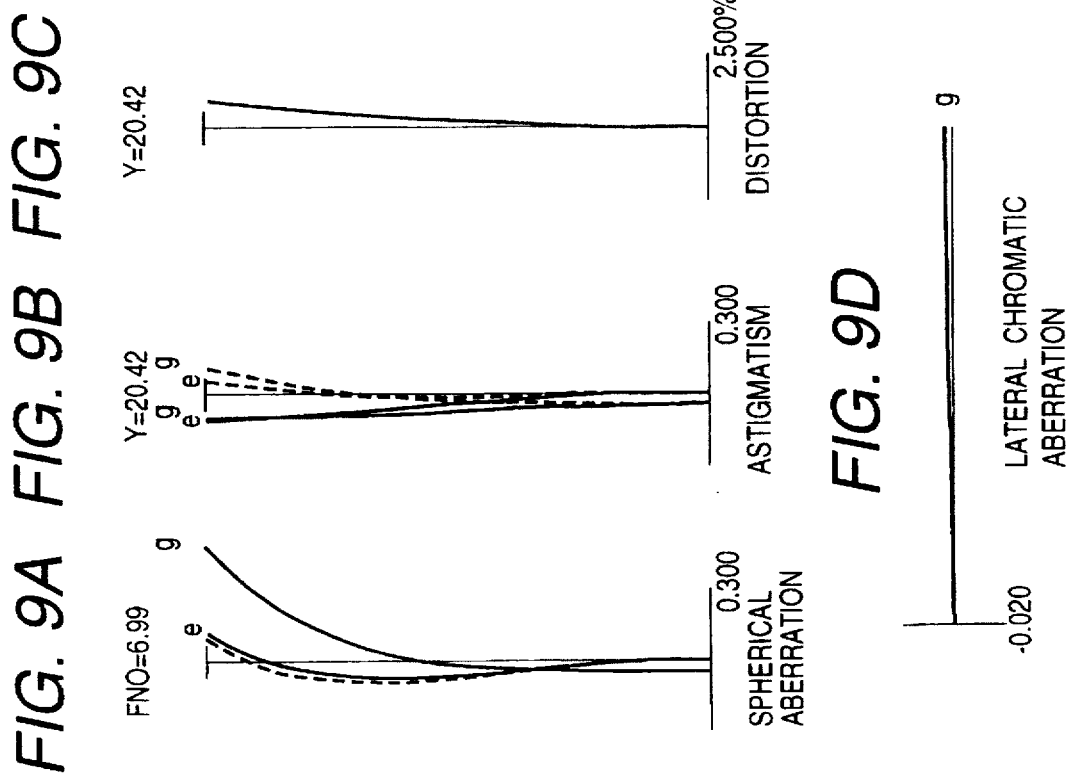

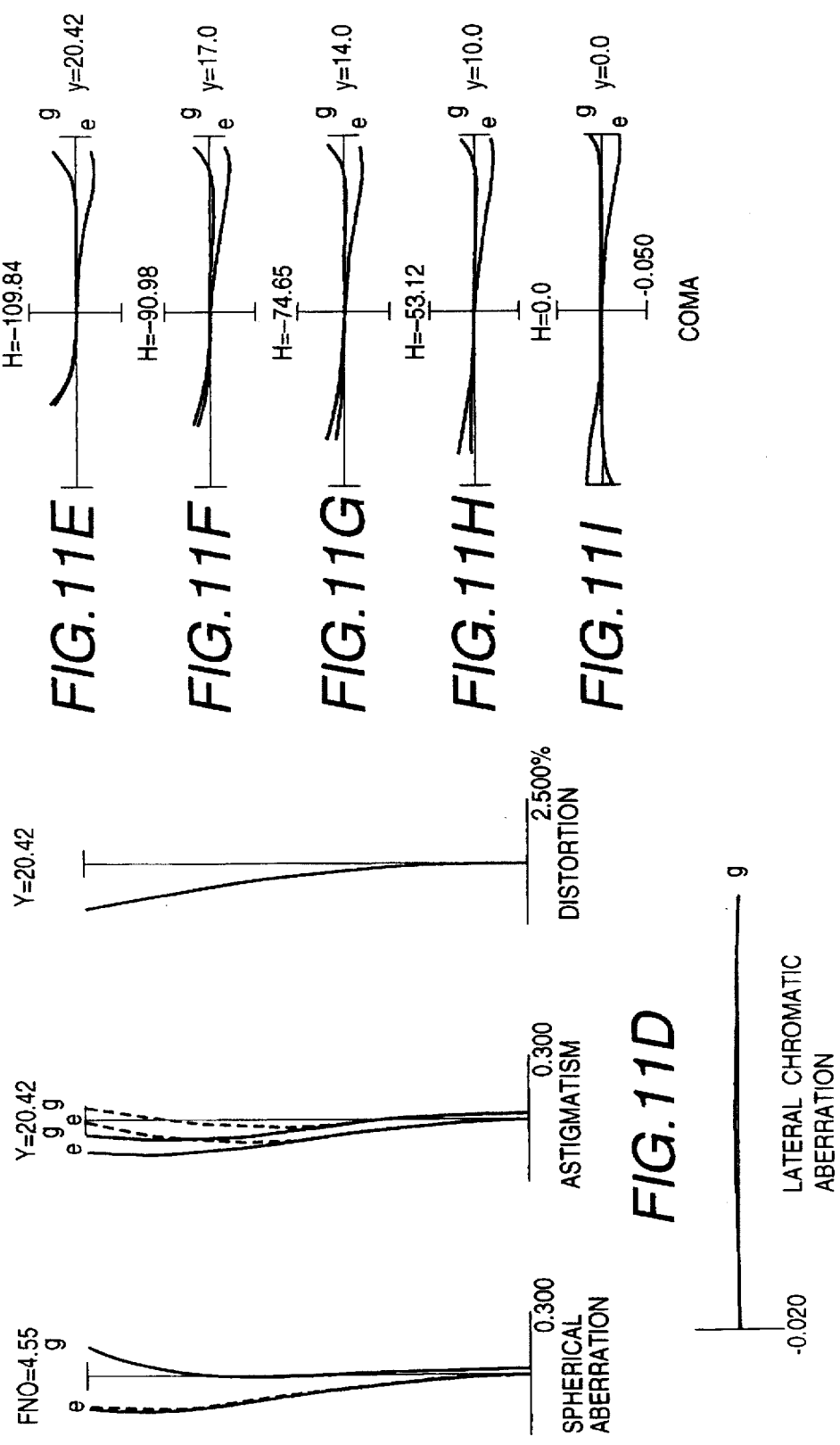

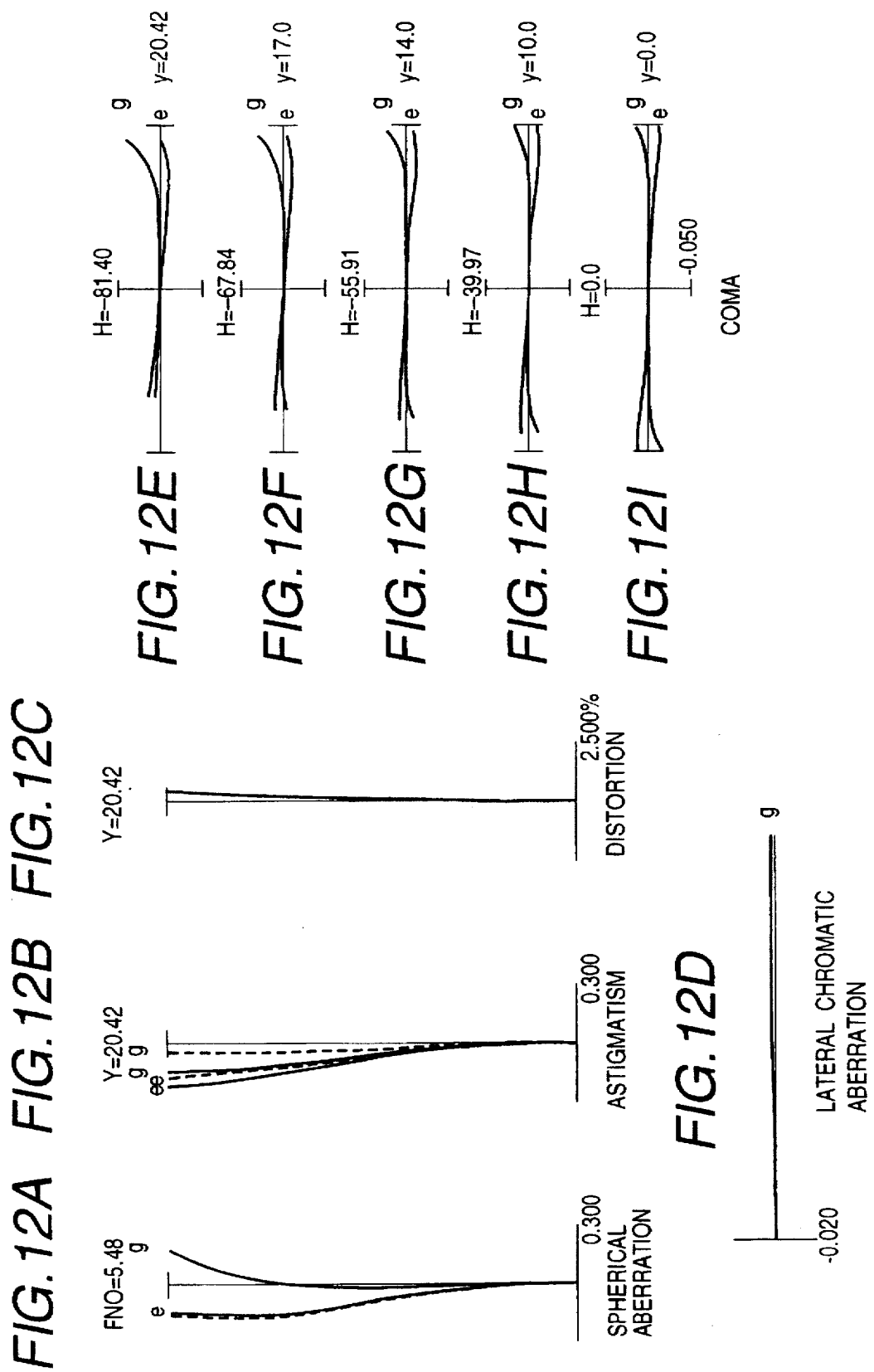

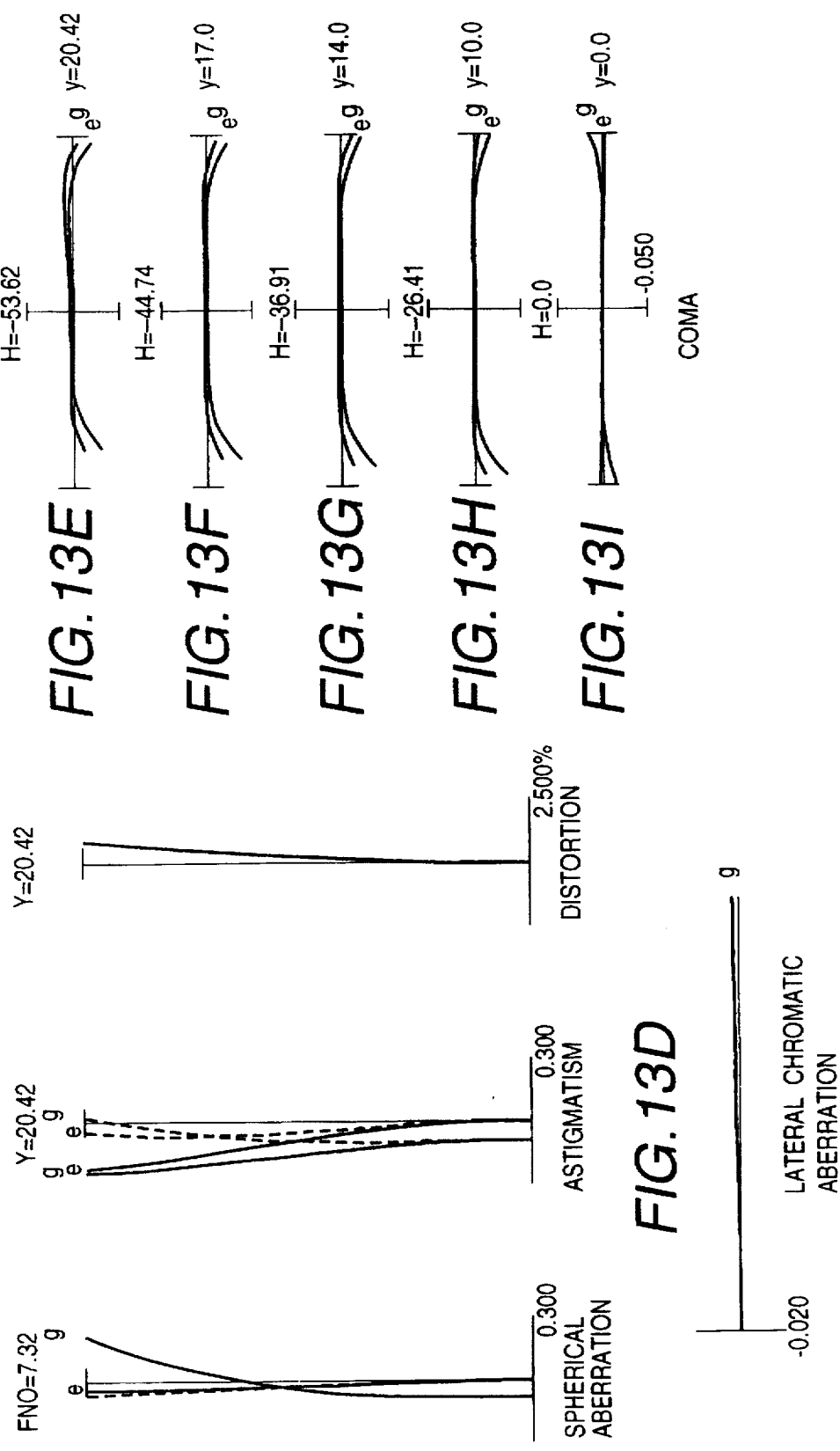

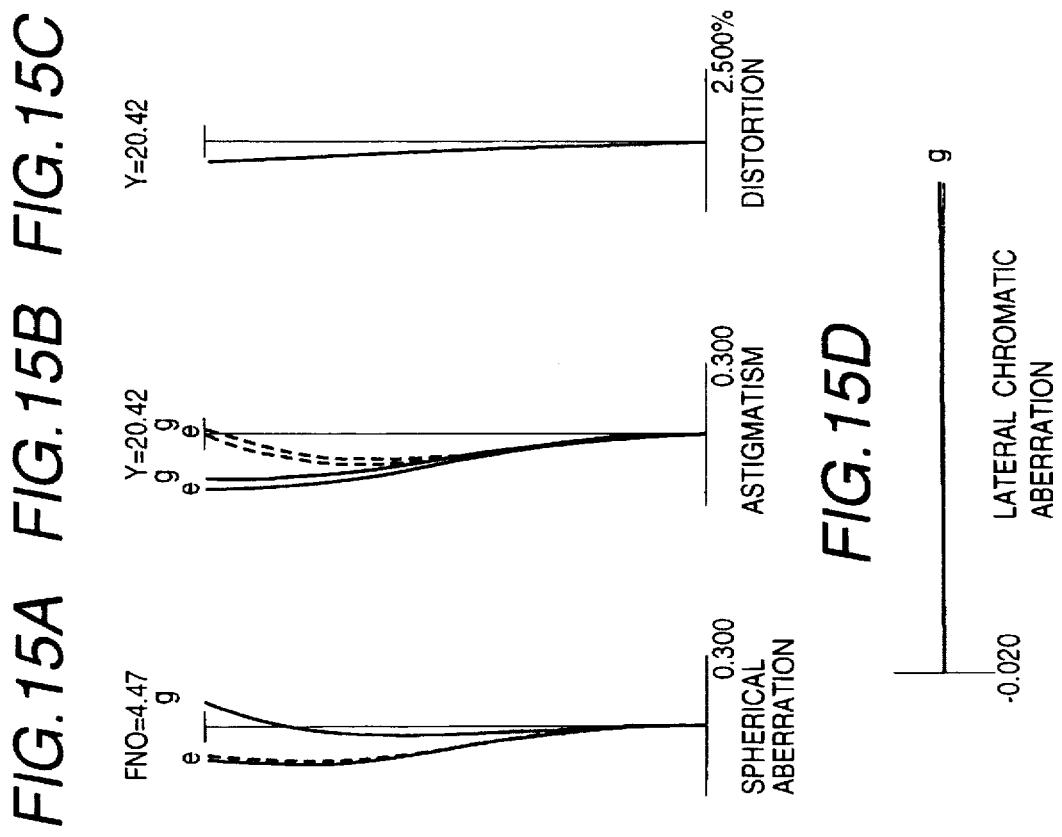

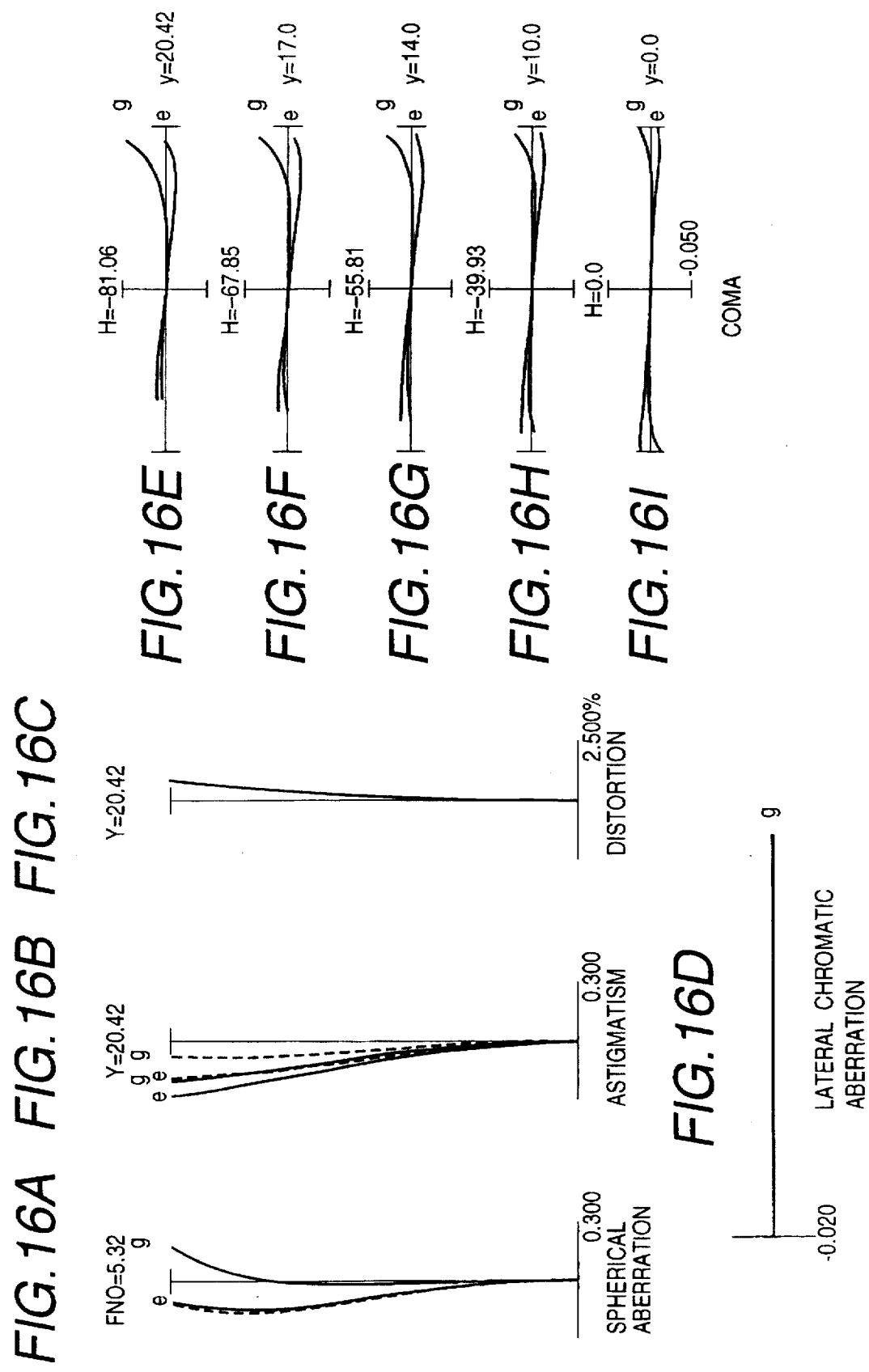

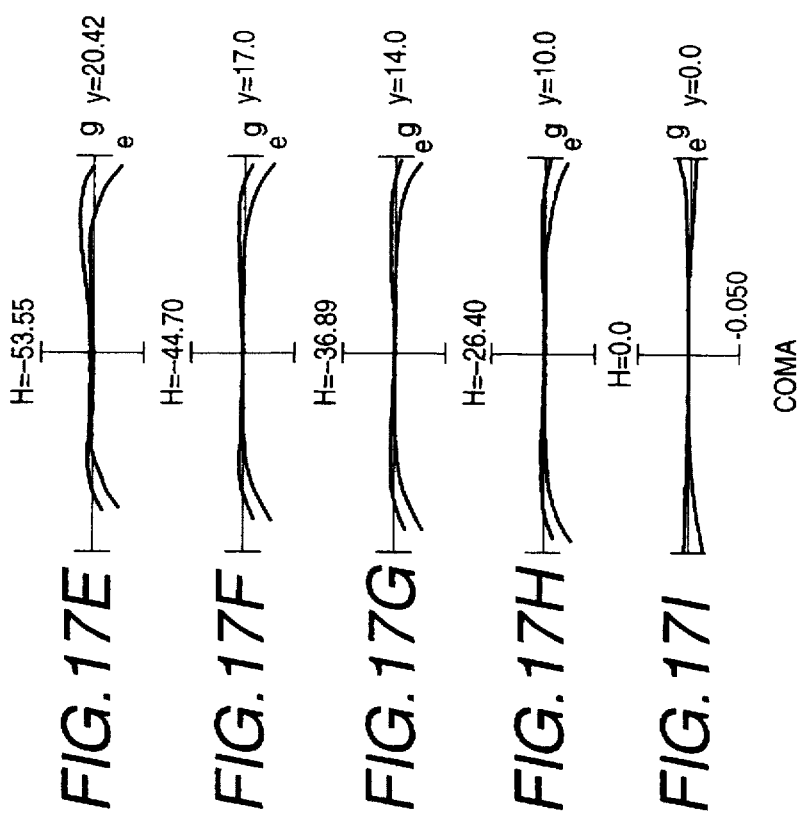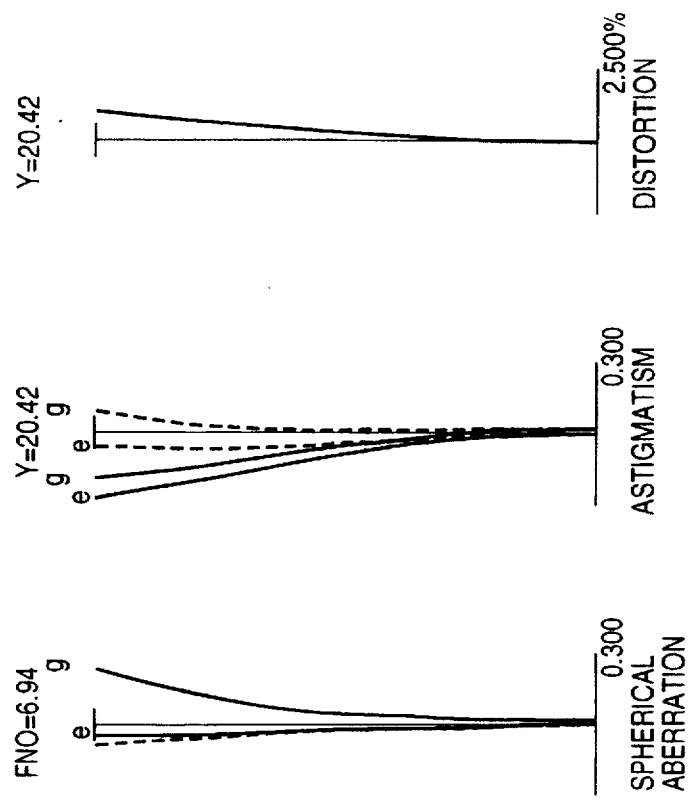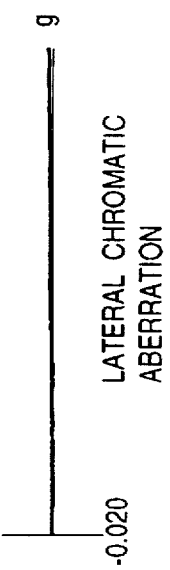

VARIABLE FOCAL LENGTH OPTICAL SYSTEM

BACKGROUND OF THE INVENTION

1. Field of the Invention

The present invention relates to a variable focal length optical system and, more particularly, to a variable focal length optical system for a limited distance, i.e., a predetermined limited object-to-image distance.

2. Related Background Art

In recent years, facsimile apparatuses or image scanners use a so-called original read optical system for reading an original.

There are three optical design requirements for this original read optical system such that (1) the distortion is small, (2) high optical performance can be obtained within the entire range from the central portion of a frame to its peripheral portion, and (3) a sufficient peripheral light amount can be obtained even at the frame peripheral portion.

Original read optical systems are classified into fixed focal length optical systems having a predetermined lateral magnification and variable focal length optical systems having a variable lateral magnification. Particularly, a variable focal length optical system has a high versatility because it can read originals not only in a predetermined size but also in a free size or read part of an original in a large size to obtain a high resolution. For this reason, variable focal length optical systems are becoming popular as original read optical systems.

Variable focal length optical systems are generally classified into systems in which the object-to-image distance changes in accordance with the imaging magnification and systems in which the object-to-image distance is constant independently of the imaging magnification.

The system capable of changing the object-to-image distance uses a fixed-focus lens to change the object-to-image distance, thereby changing the imaging magnification. The system which fixes the object-to-image distance uses a zoom lens to change the focal length of the lens system, thereby changing the imaging magnification while maintaining a predetermined object-to-image distance.

The former is disclosed in, e.g., Japanese Patent Application Laid-Open No. 60-122917. The latter is disclosed in, e.g., Japanese Patent Application Laid-Open No. 57-73715, 61-129613, or 6-230280.

To read an original by a facsimile apparatus or an image scanner, a line sensor in which light-receiving elements having a photoelectric conversion function are arranged in a line is mainly used. An original read method is mainly used, in which an original is read as a linear image while moving the original in a direction perpendicular to the alignment direction of the light-receiving elements.

Along with the recent advances in microprocessing techniques, line sensors constituted by finer light-receiving elements to achieve a high resolution are proposed. In addition, as color printers become popular, and line sensors capable of reading an image by separating its color into three colors of red (to be referred to as R hereinafter), green (to be referred to as G hereinafter), and blue (to be referred to as B hereinafter) are popularly used, specifications for higher performance are required for the optical design of an original read optical system.

To obtain a high resolution by an optical system, a higher contrast must be obtained with respect to a higher spatial frequency. Therefore, the residual aberration amount must be decreased for the entire frame. In addition, to achieve color separation into R, G, and B, the residual chromatic aberration must be small from the center of the frame to its periphery.

In the system capable of changing the object-to-image distance, a deflecting mirror consisting of two mirrors is used to efficiently utilize the space. However, the moving amount of the mirror or lens necessary for changing the imaging magnification is large, so this system is not suitable for size reduction of the entire optical system.

Therefore, the system having a fixed object-to-image distance is more suitable for size reduction of the entire optical system and also suitable as a variable focal length optical system.

However, the refractive power arrangement of the lens system disclosed in Japanese Patent Application Laid-Open No. 57-73715 has a positive/negative two-unit structure. The second lens unit having a positive refractive power has a refractive power arrangement of an almost symmetrical type with respect to a stop. For this reason, the refractive power arrangement of the entire lens system becomes asymmetrical, and a large negative distortion is undesirably generated.

In the lens system disclosed in Japanese Patent Application Laid-Open No. 61-129613, the second lens unit has a positive/negative refractive power arrangement to reduce the total lens length. However, since the total lens length in the maximum wide-angle state becomes large, this system is not suitable for size reduction.

In the lens system disclosed in Japanese Patent Application Laid-Open No. 6-230280, the total lens length becomes large relative to the diagonal length of the frame. For this reason, the entire optical system undesirably becomes bulky.

In the conventional original read optical system, aberrations for the three colors of R, G, and B are not sufficiently independently corrected. Therefore, optical performance necessary for an original read optical system cannot be sufficiently satisfied.

SUMMARY OF THE INVENTION

The present invention has been made in consideration of the above problems, and has as an object to provide a compact original read variable focal length optical system which can minimize chromatic aberrations and obtain high optical performance from the central portion of a frame to its peripheral portion.

In order to achieve the above object, according to the first aspect of the present invention, there is provided a variable focal length optical system consisting of, in the following order from an object side, a first lens unit having a negative refractive power and a second lens unit having a positive refractive power, wherein a focal length of an entire lens system changes when a distance between the first lens unit and the second lens unit is changed, and the following condition is satisfied:

$$0.3 < |f2/f1| < 0.5 \quad (1)$$

where f1 is the focal length of the first lens unit, and f2 is the focal length of the second lens unit.

According to the second aspect of the present invention, there is provided a variable focal length optical system consisting of, in the following order from an object side, a first lens unit having a negative refractive power and a second lens unit having a positive refractive power, wherein a focal length of an entire lens system changes when a distance between the first lens unit and the second lens unit is changed, the second lens unit comprises a positive lens unit and a negative lens unit arranged on an image side of the positive lens unit, and the following conditions are satisfied:

$$0.25 < Bfw/2Y < 0.77 \quad (2)$$

$$0.45 < f2P/f2N < 0.8 \quad (3)$$

where Bfw is the back focus for an object at a predetermined position, which is obtained when an imaging magnification is minimum, 2Y is the diagonal length of a frame, f2P is the focal length of the first lens component of the second lens unit, and f2N is the focal length of the second lens component of the second lens unit.

According to the third aspect of the present invention, there is provided a variable focal length optical system consisting of, in the following order from an object side, a first lens unit having a negative refractive power and a second lens unit having a positive refractive power, wherein a focal length of an entire lens system changes when a distance between the first lens unit and the second lens unit is changed, the first lens unit has a negative lens and a positive lens arranged on an image side of the negative lens, the second lens unit has, in the following order from the object side, a biconvex lens and a cemented negative lens composed of a biconvex lens and a biconcave lens, and a negative meniscus lens with a concave surface facing an aperture stop to be closest to an image plane, and the following condition is satisfied:

$$v1 > 45$$

where v1 is the Abbe number of a negative lens arranged in the second lens unit to be closest to the image plane.

The above and other objects, features and advantages of the present invention will be explained hereinafter and may be better understood by reference to the drawings and the descriptive matter which follows.

BRIEF DESCRIPTION OF THE DRAWINGS

FIGS. 3A to 3I are graphs showing various aberrations in the maximum wide-angle state of the first embodiment;

FIGS. 4A to 4I are graphs showing various aberrations in the intermediate focal length state of the first embodiment;

FIGS. 5A to 5I are graphs showing various aberrations in the maximum telephoto state of the first embodiment;

FIGS. 7A to 7I are graphs showing various aberrations in the maximum wide-angle state of the second embodiment;

FIGS. 8A to 8I are graphs showing various aberrations in the intermediate focal length state of the second embodiment;

FIGS. 9A to 9I are graphs showing various aberrations in the maximum telephoto state of the second embodiment;

Figs. 11A to 11I are graphs showing various aberrations in the maximum wide-angle state of the third embodiment;

FIGS. 12A to 12I are graphs showing various aberrations in the intermediate focal length state of the third embodiment;

FIGS. 13A to 13I are graphs showing various aberrations in the maximum telephoto state of the third embodiment;

FIGS. 15A to 15I are graphs showing various aberrations in the maximum wide-angle state of the fourth embodiment;

FIGS. 16A to 16I are graphs showing various aberrations in the intermediate focal length state of the fourth embodiment; and FIGS. 17A to 17I are graphs showing various aberrations in the maximum telephoto state of the fourth embodiment.

DETAILED DESCRIPTION OF THE PREFERRED EMBODIMENTS

Figure 1:
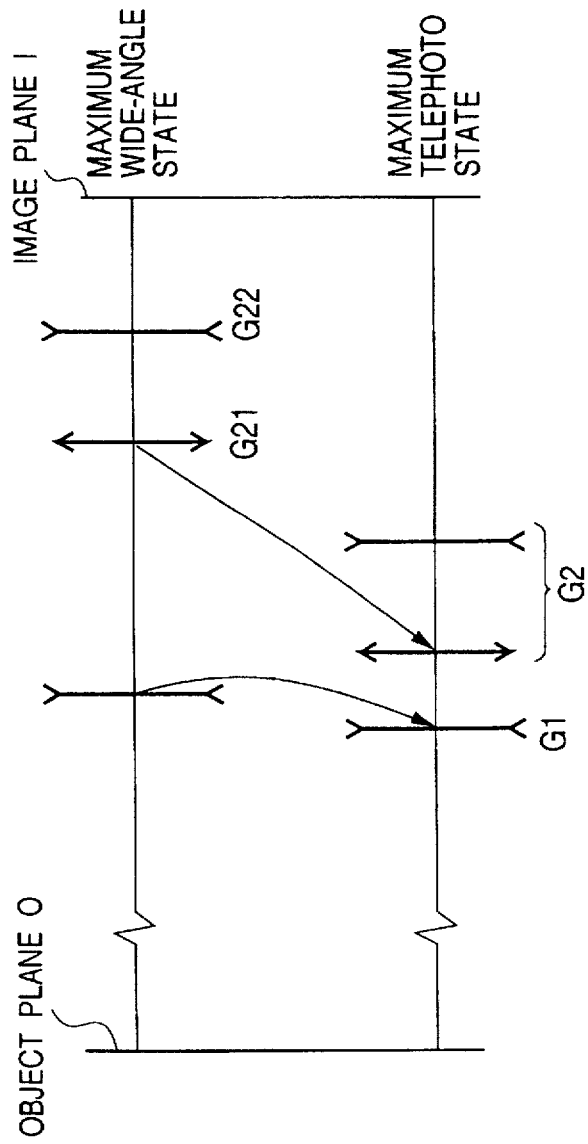
FIG. 1 is a view showing the refractive power arrangement of a variable focal length optical system according to the present invention.

The refractive power arrangement of a variable focal length optical system (to be referred to as a zoom lens hereinafter) according to the present invention and the functions of the respective lenses will be described first.

The zoom lens according to the present invention employs a negative/positive two-unit zoom lens having a minimum number of movable lens units whose moving amount is relatively small to achieve size reduction and simplify the lens barrel structure.

In the maximum wide-angle state (when the imaging magnification is minimum), a first lens unit having a negative refractive power and a second lens unit having a positive refractive power are arranged to be separated from each other, and a stop is arranged in the second lens unit. With this arrangement, an off-axis light beam passing through the first lens unit is separated from the optical axis, so that an on-axis aberration and an off-axis aberration can be independently corrected.

In a zooming operation from the maximum wide-angle state to the maximum telephoto state (when the imaging magnification is maximum), the distance between the first lens unit and the second lens unit is decreased such that the off-axis light beam passing through the first lens unit approaches the optical axis. With this arrangement, a variation in off-axis aberration which tends to be generated in the zooming operation is satisfactorily corrected.

The second lens unit comprises a first lens component including the stop and having a positive refractive power and a second lens component arranged on the image side of the first lens component and having a negative refractive power. The total lens length is reduced by arranging the principal point of the second lens unit on the object side of the lens system.

When the second lens unit has the above arrangement, the refractive power arrangement of the entire zoom lens system is made close to that of a symmetrical type, i.e., a negative/positive/negative type. Therefore, a negative distortion which tends to be generated in the negative/positive two-unit zoom lens can be satisfactorily corrected, and an original can be correctly read.

When the back focus in the maximum wide-angle state is decreased to some extent, the off-axis light beam passing through the second lens component is separated from the optical axis, so that the on-axis aberration and the off-axis aberration can be independently corrected. The first lens unit and the second lens component of the second lens unit share correction of the off-axis aberration. With this arrangement, the off-axis aberration can be satisfactorily corrected, so that high optical performance can be obtained not only at the central portion of the frame but also at its peripheral portion.

In the zooming operation from the maximum wide-angle state to the maximum telephoto state, the second lens unit is moved to the object side to increase the back focus. At this time, the off-axis light beam passing through the second lens component approaches the optical axis, so that the off-axis aberration generated in the zooming operation can be corrected.

However, when the back focus in the maximum wide-angle state is too small, the off-axis light beam passing through the second lens component is excessively separated from the optical axis. This increases the lens diameter or generates a large positive distortion. For this reason, even when the vignetting factor is increased, the exit pupil diameter for a large image height becomes much smaller than that in the paraxial region, resulting in a difficulty in obtaining a predetermined peripheral light amount.

The first lens component of the second lens unit is a unique lens component having a positive refractive power. Since this positive refractive power is strong, the negative spherical aberration generated in only the first lens component must be satisfactorily corrected. In the present invention, the lens shape is advantageous to increase the diameter.

When the off-axis light beam passing through the first lens component of the second lens unit is separated from the optical axis, not only the on-axis aberration but also the off-axis aberration in the first lens component must be satisfactorily corrected, resulting in disadvantages including an increase in number of lenses. For this reason, the first lens component is divided into a first positive partial component arranged on the object side and a second positive partial component arranged on the image side. By arranging the aperture stop between the first positive partial component and the second positive partial component, high performance is achieved with a small number of lenses.

From another viewpoint, in the variable focal length optical system of the present invention, the second lens unit is constituted by the first lens component having a positive refractive power and the second lens component having a negative refractive power. The negative refractive power of the first lens unit is shifted to the second lens component of the second lens unit. With this arrangement, the negative refractive power of the first lens unit is weakened.

Therefore, the number of lenses constituting the first lens unit can be decreased. In addition, when the off-axis light beam passing through the first lens unit is too far from the optical axis, the lens diameter is increased. For this reason, by constituting the first lens unit to have a negative/positive refractive power arrangement, the off-axis light beam is prevented from being excessively separated from the optical axis.

The respective conditions will be described below.

Condition (1) defines the ratio of the focal length of the first lens unit to that of the second lens unit.

When f2/|f1| of condition (1) exceeds the upper limit value, the diverging action of the first lens unit increases, resulting in an increase in total zoom lens length. To the contrary, when f2/|f1| is smaller than the lower limit value, the diverging action of the first lens unit decreases. The off-axis light beam passing through the first lens unit is separated from the optical axis. When a predetermined peripheral light amount is to be obtained in the maximum wide-angle state, the lens diameter undesirably increases.

Condition (2) defines the back focus in the maximum wide-angle state such that size reduction of the lens system is achieved while maintaining a predetermined peripheral light amount.

When Bfw/2Y of condition (2) exceeds the upper limit value, the use magnification of the second lens component increases in the positive direction to strengthen the diverging action. Therefore, the total zoom lens length is undesirably increases. When Bfw/2Y is smaller than the lower limit value, the positive distortion generated in the second lens component increases, as described above, resulting in a difficulty in obtaining a predetermined peripheral light amount.

In the present invention, preferably, the following condition is further satisfied:

$$0.4 < f2N/f1 < 1.2 \tag{4}$$

where f2N: the focal length of the second lens component of the second lens unit Condition (4) defines the ratio of the focal length of the first lens unit to that of the second lens component of the second lens unit such that a variation in coma generated in the zooming operation is satisfactorily corrected.

When f2N/f1 of condition (4) exceeds the upper limit value, the negative refractive power of the first lens unit decreases. The off-axis light beam passing through the first lens unit approaches the optical axis, and the coma for the lower light beam largely varies in the zooming operation. To the contrary, when f2N/f1 is smaller than the lower limit value, the negative refractive power of the second lens component of the second lens unit decreases. The off-axis light beam passing through the second lens component approaches the optical axis, and the coma for the upper light beam largely varies in the zooming operation. In both the cases, the variation in coma generated in the zooming operation cannot be suppressed, resulting in a difficulty in obtaining predetermined optical performance.

In the present invention, to further reduce the total lens length while maintaining high optical performance, the upper limit value of condition (4) is preferably set to be 0.9. To further reduce the lens diameter, the lower limit value is preferably set to be 0.55.

To define the use magnification of the second lens unit, preferably, the following condition is satisfied:

$$0.9 < (\beta 2t \cdot \beta 2w)^{1/2} < 1.1 \tag{5}$$

where

β2w: the lateral magnification obtained when the imaging magnification of the second lens unit is minimum β2t: the lateral magnification obtained when the imaging magnification of the second lens unit is maximum As described above, in a scanner optical system, the contrast for a high frequency must be kept high, so that the lens position must be controlled with a high precision.

A lens position precision Δ necessary for the second lens unit is given as $$\Delta = \delta/(1-\beta^2)^2$$

where δ is the lens position precision necessary on the image plane, and β is the use magnification of the second lens unit.

When $\beta^2$ is close to 1, sufficiently high optical performance can be obtained even when the lens position precision of the second lens unit is considerably low. In the present invention, by satisfying condition (5), sufficiently high optical performance can be obtained even when the lens position precision of the second lens unit is low within the entire variable range.

When $(\beta 2t \cdot \beta 2w)^{1/2}$ of condition (5) exceeds the upper limit value or is smaller than the lower limit value, the lens position precision necessary for the second lens unit becomes high. Therefore, a lens stop precision necessary for obtaining optical performance can hardly be obtained in manufacturing.

When the lens position precision is low, the control system can be simplified, and an inexpensive high-quality apparatus can be provided.

In the present invention, when the lower limit value of condition (5) is set to be 0.95, and the upper limit value is set to be 1.05, the moving amount of the first lens unit is further decreased, so that the control system can be simplified.

In the present invention, preferably, condition (6) is satisfied, which defines the air gap between the lenses sandwiching the aperture stop:

$$0.1 < D/f2 < 0.5 \quad (6)$$

where

D: the air gap along the optical axis between the lens surface of the first positive partial component arranged adjacent to the aperture stop to be closest to the object and the lens surface of the second positive partial component arranged adjacent to the aperture stop to be closest to the image As described above, the first lens component mainly corrects the on-axis aberration. However, to completely correct the curvature of field within the entire variable range, preferably, the first lens component also contributes to correct the off-axis aberration of the entire lens system. Condition (6) defines a condition for this purpose.

When D/f2 of condition (6) exceeds the upper limit value, the off-axis aberration generated in the first positive partial component of the first lens component of the second lens unit and in the second positive partial component of the first lens component of the second lens unit becomes too large. Therefore, the first lens component of the second lens unit can hardly be constituted with a small number of lenses. To the contrary, when D/f2 is smaller than the lower limit value, the on-axis aberration and the off-axis aberration can hardly be independently corrected, so high performance cannot be achieved.

Condition (3) defines the ratio of the focal length of the first lens component of the second lens unit to that of the second lens component. When f2P/f2N of condition (3) is smaller than the lower limit value, the coma for the upper light beam increases in the maximum wide-angle state, so predetermined optical performance cannot be obtained. To the contrary, when f2P/f2N exceeds the upper limit value, the negative spherical aberration generated in the first lens component of the second lens unit increases, and the optical performance is undesirably degraded for the entire frame.

As for the negative lens of the second lens unit, which is arranged to be closest to the image plane, preferably, condition (7) is satisfied to minimize a lateral chromatic aberration:

$$v1 > 45 \quad (7)$$

where v1: the Abbe number of the negative lens of the second lens unit, which is arranged to be closest to the image plane When v1 of condition (7) is smaller than the lower limit value, the lateral chromatic aberration increases particularly in the maximum wide-angle state, and color misregistration is generated.

In the present invention, a glass member having a high anomalous dispersion or a glass member having a very small dispersion is used for the first lens component of the second lens unit, thereby minimizing the secondary dispersion. With this arrangement, even when three colors of R, G, and B are received by different line sensors, color misregistration can be minimized.

As described above, when the zoom lens is set in an in-focus state with the reference distance, the shooting magnification can be changed while maintaining a predetermined object-to-image distance, so that the zoom lens can function as an original read optical system. However, a zoom lens for a camera does not always function as an original read optical system.

A zoom lens is mainly used for a still camera or a video camera. The zoom lens for a still camera largely differs from that for an original read system in the following points. The photosensitive particles of the photosensitive material are sufficiently fine, and even when the colors of R, G, and B are not sufficiently independently corrected, no color misregistration is recognized. As for the photosensitive material, the exposure amount range for obtaining proper exposure is wide, and even with an underexposure amount, the underexposure amount is hardly recognized after development. In a zoom lens for a video camera, although the frame size is small, one element of a CCD used as an image pickup device is not small. Therefore, the performance need not be improved, and even a distortion is permitted.

Therefore, the simple use of the zoom lens for a still camera or a video camera is inappropriate.

The variable focal length optical system of the present invention, however, can easily function as a zoom lens for a still camera or a video camera when the first lens unit is used as a focusing unit.

In the present invention, the displacement of the image plane position, which is generated when the original position is displaced along the optical axis, can be corrected by moving the first lens unit or the second lens unit, or integrally moving the first lens unit and the second lens unit. Particularly, when the first lens unit and the second lens unit are moved such that the distance between the first lens unit and the second lens unit is changed, the image plane position can be corrected while satisfactorily correcting variations in various aberrations generated by the displacement of the original position.

As disclosed in Japanese Patent Application Laid-Open No. 57-11333, when the first lens unit or the second lens unit is shifted in a direction perpendicular to the optical axis, the readable range of the photoelectric conversion unit such as a CCD can be shifted.

In addition, when an aspherical surface is inserted in one of the lens units, high performance can easily be obtained. Particularly, when the aspherical surface is inserted in the first lens unit separated from the aperture stop or the second lens component of the second lens unit, the off-axis aberration can be satisfactorily corrected. Alternatively, when the aspherical surface is inserted in the first lens component of the second lens unit arranged near the aperture stop, the lens diameter can easily be increased.

[Embodiments]

The respective embodiments of the present invention will be described below.

FIG. 1 is a view showing the refractive power arrangement of the variable focal length optical system according to each embodiment of the present invention. The variable focal length optical system of the present invention comprises, in the following order from an object O side, a first lens unit G1 having a negative refractive power and a second lens unit G2 having a positive refractive power. In the zooming operation from the maximum wide-angle state to the maximum telephoto state, the first lens unit G1 is temporarily moved to an image I side such that the air gap between the first lens unit and the second lens unit is decreased, and then moved to the object O side, and the second lens unit G2 is monotonously moved to the object O side. The second lens unit G2 comprises a first lens component having a positive refractive power and a second lens component having a negative refractive power.

(First Embodiment)

Figure 2:
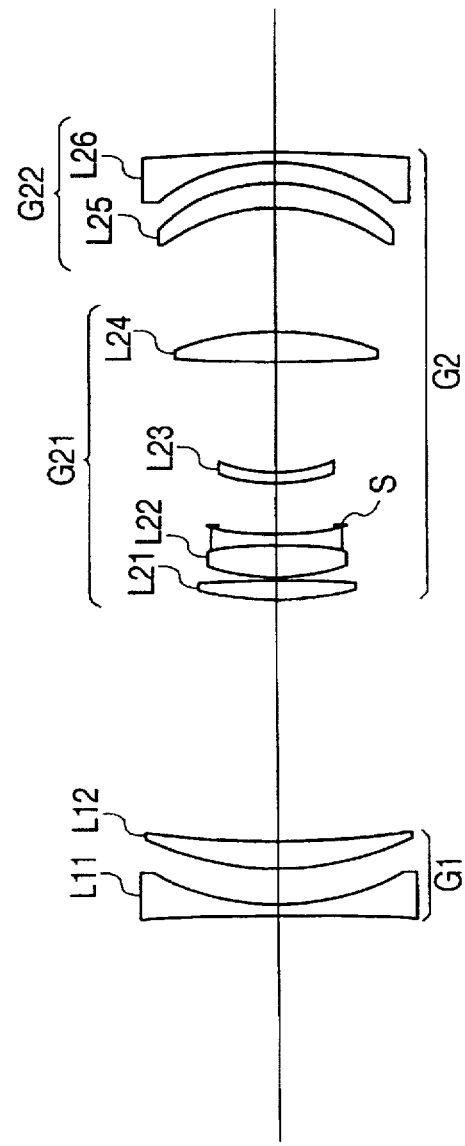
FIG. 2 is a sectional view showing a lens arrangement of the first embodiment.

FIG. 2 is a sectional view showing a lens arrangement of the first embodiment of the present invention.

The zoom lens of the first embodiment comprises, in the following order from the object side, a first lens unit G1 having a negative refractive power as a whole and a second lens unit G2 having a positive refractive power as a whole. The first lens unit G1 comprises, in the following order from the object side, a biconcave lens L11 and a positive meniscus lens L12 with its convex surface facing the object side.

The second lens unit G2 comprises, in the following order from the object side, a biconvex lens L21, a cemented lens L22 composed of a biconvex lens and a biconcave lens, a negative meniscus lens L23 with its concave surface facing the image side, a biconvex lens L24, a positive meniscus lens L25 with its convex surface facing the image side, and a negative meniscus lens L26 with its concave surface facing the object side.

The lenses L21 to L24 form a first lens component G21, and the lenses L25 and L26 form a second lens component L22. In addition, the lenses L21 and L22 constitute a first positive partial component, and the lenses L23 and L24 constitute a second positive partial component. A stop S is arranged between the lens L22 and the lens L23.

In the first embodiment, a 3-mm thick plate glass member (refractive index for the e-line: 1.52428, and Abbe number: 58.80) is inserted between the object position and the first lens unit in the zooming operation, and a 0.8-mm thick plate glass member is inserted between the second lens unit and the image plane position. These plate glass members are fixed with respect to the image plane and the object plane in the zooming operation (a radius of curvature of 0 means a flat surface).

Table 1 shows numerical data of the first embodiment of the present invention. In this table, f is the focal length, FN is the F-number, β is the imaging magnification, FNO is the effective F-number, H is the object height, and y is the image height. The refractive index is a value for the e-line (λ=546.1 nm). Surface number 0 represents the object plane and indicates the distance between the plate glass member and the object plane.

TABLE 1

| β | −0.1790 to −0.2500 to −0.3780 |
| FN | 3.83 to 4.20 to 4.72 |
| FNO | 4.46 to 5.26 to 6.78 |
| H | −107.31 to −78.80 to −51.15 |
| y | 20.42 |

| Surface number | Radius of curvature | Surface-to-surface distance | Refractive index | Abbe number | | | |
|---|---|---|---|---|---|---|---|
| 0 | | 2.00 | 1.0 | | | | |
| 1 | 0.0000 | 3.00 | 1.52428 | 58.80 | (plate glass) | | |
| 2 | 0.0000 | (D2) | 1.0 | | | | |

TABLE 1-continued

| 3 | −267.8331 | 1.20 | 1.77651 | 49.45 | L11 | G1 | |
| 4 | 31.1151 | 4.40 | 1.0 | | | | |
| 5 | 37.1492 | 3.40 | 1.67765 | 32.17 | L12 | | |
| 6 | 175.9009 | (D6) | 1.0 | | | | |
| 7 | 40.8315 | 2.50 | 1.84503 | 43.35 | L21 | G2 | G21 |
| 8 | −91.0419 | 0.10 | 1.0 | | | | |
| 9 | 22.7155 | 4.20 | 1.49926 | 82.52 | L22 | | |
| 10 | −45.9596 | 1.20 | 1.80945 | 33.89 | | | |
| 11 | 34.2655 | 1.00 | 1.0 | | | | |
| 12 | 0.0000 | 5.35 | 1.0 | (stop) | S | | |
| 13 | 28.6194 | 1.20 | 1.75455 | 35.19 | L23 | | |
| 14 | 18.2542 | 13.50 | 1.0 | | | | |
| 15 | 223.7545 | 3.40 | 1.62287 | 60.14 | L24 | | |
| 16 | −36.3454 | 15.00 | 1.0 | | | | |
| 17 | −22.6389 | 3.00 | 1.58482 | 40.76 | L25 | | G22 |
| 18 | −20.1673 | 2.50 | 1.0 | | | | |
| 19 | −23.0902 | 1.20 | 1.48914 | 70.41 | L26 | | |
| 20 | −165.6851 | (D20) | 1.0 | | | | |
| 21 | 0.0000 | 0.80 | 1.52428 | 58.80 | (plate glass) | | |
| 22 | 0.0000 | 1.20 | 1.0 | | | | |

Variable Distances

| β | −0.1890 | −0.2500 | −0.3780 |
| D2 | 232.9812 | 237.8757 | 232.9918 |
| D6 | 28.8950 | 14.7050 | 1.8060 |
| D20 | 17.9788 | 27.2733 | 45.0522 |

Condition Corresponding Values f1 = −84.9021
f2 = 38.2972
Bfw = 19.9787
(Bfw was calculated while excluding the protection glass)
f2N = −69.9842
β2w = −0.7069
β2t = −1.4139
f2P = 40.477
(1) f2/|f1| = 0.451
(2) Bfw/2Y = 0.489
(3) f2N/f1 = 0.824
(4) (β2t · β2w)$^{1/2}$ = −1.000
(5) D/f2 = 0.162
(6) f2P/f2N| = 0.578
(7) v1 = 70.41

FIGS. 3A to 5I are graphs showing various aberrations of the first embodiment of the present invention. FIGS. 3A to 3I show various aberrations in the maximum wide-angle state, FIGS. 4A to 4I show various aberrations in the intermediate focal length state, and FIGS. 5A to 5I show various aberrations in the maximum telephoto state.

In FIGS. 3A to 5I, in each graph showing a spherical aberration, a solid curve represents the spherical aberration, a dotted curve represents the sine condition, and y is the image height. In each graph showing an astigmatism, a solid curve represents the sagittal image plane, and a broken curve represents the meridional image plane. e is the aberration for the e-line, and g is the aberration for the g-line. In each graph showing a coma, comas at the image height y=0, 10, 14, 17, 20, and 42 are shown, and H is the object height.

As can be seen from these graphs, in this embodiment, various aberrations are satisfactorily corrected, and excellent imaging performance is obtained.

(Second Embodiment)

Figure 6:
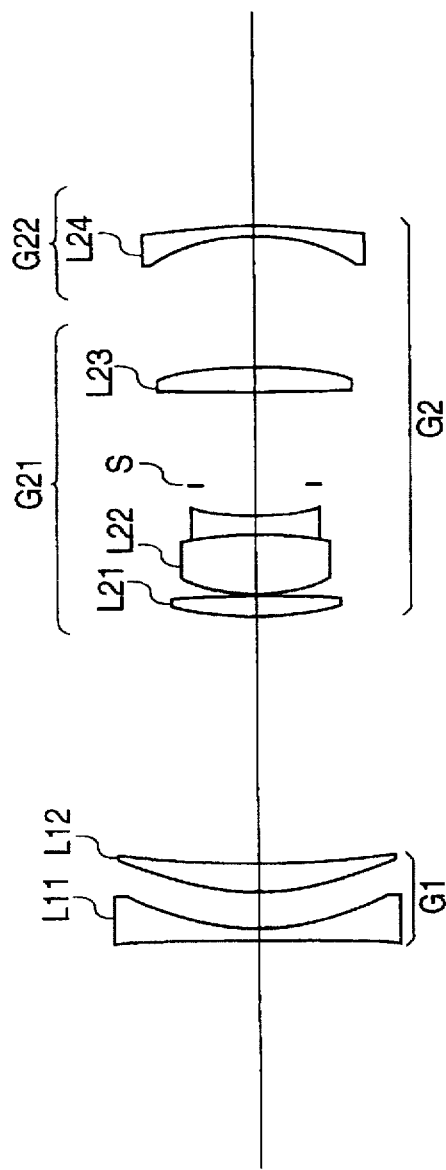
FIG. 6 is a sectional view showing a lens arrangement of the second embodiment.

FIG. 6 is a sectional view showing a lens arrangement of the second embodiment of the present invention.

The zoom lens of the second embodiment comprises, in the following order from the object side, a first lens unit G1 having a negative refractive power as a whole and a second lens unit G2 having a positive refractive power as a whole. The first lens unit G1 comprises, in the following order from the object side, a biconcave lens L11 and a positive meniscus lens L12 with its convex surface facing the object side.

The second lens unit G2 comprises, in the following order from the object side, a biconvex lens L21, a cemented lens L22 composed of a biconvex lens and a biconcave lens, a positive meniscus lens L23 with its convex surface facing the image side, and a negative meniscus lens L24 with its concave surface facing the object side.

The lenses L21 to L23 form a first lens component, and the lens L24 forms a second lens component. In addition, the lenses L21 and L22 constitute a first positive partial component, and the lens L23 constitutes a second positive partial component. A stop S is arranged between the lens L22 and the lens L23.

In the second embodiment, a 3-mm thick plate glass member (refractive index for the e-line: 1.52428, and Abbe number: 58.80) is inserted between the object position and the first lens unit in the zooming operation, and a 0.8-mm thick plate glass member is inserted between the second lens unit and the image plane position. These plate glass members are fixed with respect to the image plane and the object plane in the zooming operation (a radius of curvature of 0 means a flat surface).

Table 2 shows numerical data of the second embodiment of the present invention. In this table, f is the focal length, FN is the F-number, $\beta$ is the imaging magnification, FNO is the effective F-number, H is the object height, and y is the image height. The refractive index is a value for the e-line ($\lambda$=546.1 nm). Surface number 0 represents the object plane and indicates the distance between the plate glass member and the object plane.

TABLE 2

| | | | | |
|---|---|---|---|---|
| $\beta$ | −0.1790 to −0.2500 to −0.3780 | | | |
| FN | 3.77 to 4.17 to 4.73 | | | |
| FNO | 4.47 to 5.33 to 6.99 | | | |
| H | −109.54 to −81.28 to −53.58 | | | |
| y | 20.42 | | | |

| Surface number | Radius of curvature | Surface-to-surface distance | Refractive index | Abbe number | | |
|---|---|---|---|---|---|---|
| 0 | | 2.00 | 1.0 | | | |
| 1 | 0.0000 | 3.00 | 1.52428 | 58.80 | (plate glass) | |
| 2 | 0.0000 | (D2) | 1.0 | | | |
| 3 | −774.2855 | 1.20 | 1.80832 | 46.51 | L11 | G1 |
| 4 | 30.6267 | 5.00 | 1.0 | | | |
| 5 | 37.3384 | 3.40 | 1.72311 | 29.50 | L12 | |
| 6 | 130.2154 | (D6) | 1.0 | | | |
| 7 | 54.7353 | 2.50 | 1.80832 | 46.51 | L21 | G2 G21 |
| 8 | −78.2626 | 0.10 | 1.0 | | | |
| 9 | 20.7766 | 7.25 | 1.49926 | 82.52 | L22 | |
| 10 | −38.2768 | 2.00 | 1.81184 | 33.27 | | |
| 11 | 22.6357 | 4.00 | 1.0 | | | |
| 12 | 0.0000 | 11.00 | 1.0 | (stop) | S | |
| 13 | −416.0174 | 3.00 | 1.80832 | 46.51 | L23 | |
| 14 | −33.5784 | 15.50 | 1.0 | | | |
| 15 | −21.6570 | 1.50 | 1.62286 | 60.35 | L24 | G22 |
| 16 | −56.6042 | (D16) | 1.0 | | | |
| 17 | 0.0000 | 0.80 | 1.52428 | 58.80 | (plate glass) | |
| 18 | 0.0000 | 1.20 | 1.0 | | | |

Variable Distances

| $\beta$ | −0.1890 | −0.2500 | −0.3780 |
|---|---|---|---|
| D2 | 233.0212 | 237.9157 | 232.9998 |
| D6 | 28.9529 | 14.7269 | 1.8000 |
| D18 | 24.5754 | 33.9067 | 51.7493 |

Condition Corresponding Values f1 = −84.7793
f2 = 38.4182
Bfw = 26.5754
(Bfw was calculated while excluding the protection glass)

TABLE 2-continued f2N = −57.2607
$\beta$2w = −0.7014
$\beta$2t = −1.4157
f2P = 37.9894
(1) f2/|f1| = 0.453
(2) Bfw/2Y = 0.651
(3) f2N/f1 = 0.675
(4) ($\beta$2t · $\beta$2w)$^{1/2}$ = −0.996
(5) D/f2 = 0.390
(6) f2P/|f2N| = 0.663
(7) v1 = 60.35

FIGS. 7A to 9I are graphs showing various aberrations of the second embodiment of the present invention. FIGS. 7A to 7I show various aberrations in the maximum wide-angle state, FIGS. 8A to 8I show various aberrations in the intermediate focal length state, and FIGS. 9A to 9I show various aberrations in the maximum telephoto state.

In FIGS. 7A to 9I, in each graph showing a spherical aberration, a solid curve represents the spherical aberration, a dotted curve represents the sine condition, and y is the image height. In each graph showing an astigmatism, a solid curve represents the sagittal image plane, and a broken curve represents the meridional image plane, e is the aberration for the e-line, and g is the aberration for the g-line. In each graph showing a coma, comas at the image height y=0, 10, 14, 17, 20, and 42 are shown, and H is the object height.

As can be seen from these graphs, in this embodiment, various aberrations are satisfactorily corrected, and excellent imaging performance is obtained.

(Third Embodiment)

Figure 10:
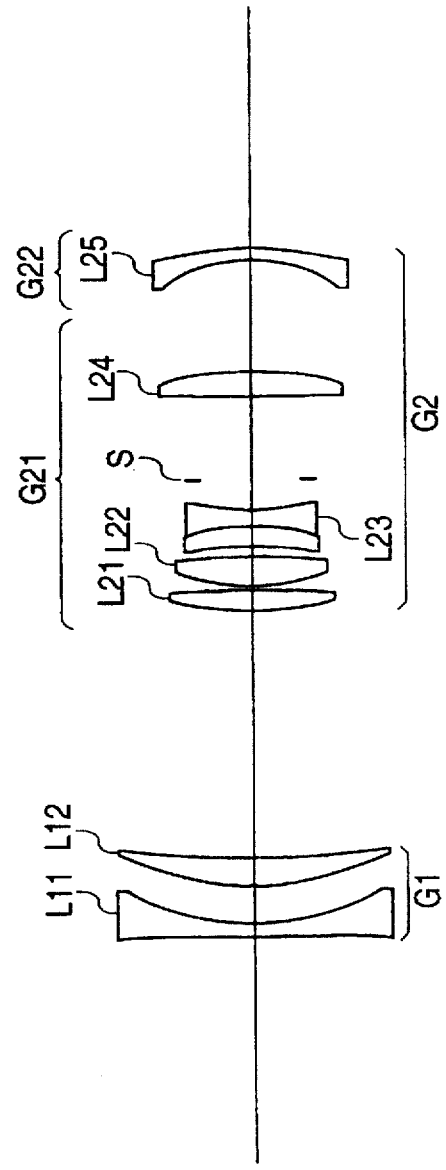
FIG. 10 is a sectional view showing a lens arrangement of the third embodiment.

FIG. 10 is a sectional view showing a lens arrangement of the third embodiment of the present invention.

The zoom lens of the third embodiment comprises, in the following order from the object side, a first lens unit G1 having a negative refractive power as a whole and a second lens unit G2 having a positive refractive power as a whole. The first lens unit G1 comprises, in the following order from the object side, a biconcave lens L11 and a positive meniscus lens L12 with its convex surface facing the object side.

The second lens unit G2 comprises, in the following order from the object side, a biconvex lens L21, a biconvex lens L22, a biconcave cemented lens L23 composed of a positive lens and a negative lens, a positive meniscus lens L24 with its convex surface facing the image side, and a negative meniscus lens L25 with its concave surface facing the object side.

The lenses L21 to L24 form a first lens component, and the lens L25 forms a second lens component. In addition, the lenses L21 to L23 constitute a first positive partial component, and the lens L24 constitutes a second positive partial component. A stop S is arranged between the lens L23 and the lens L24.

In the third embodiment, a 3-mm thick plate glass member (refractive index for the e-line: 1.52428, and Abbe number: 58.80) is inserted between the object position and the first lens unit in the zooming operation, and a 0.8-mm thick plate glass member is inserted between the second lens unit and the image plane position. These plate glass members are fixed with respect to the image plane and the object plane in the zooming operation (a radius of curvature of 0 means a flat surface).

Table 3 shows numerical data of the third embodiment of the present invention. In this table, f is the focal length, FN is the F-number, β is the imaging magnification, FNO is the effective F-number, H is the object height, and y is the image height. The refractive index is a value for the e-line (λ=546.1 nm). Surface number 0 represents the object plane and indicates the distance between the plate glass member and the object plane.

TABLE 3

| β | −0.1790 to −0.2500 to −0.3780 |
| FN | 3.83 to 4.24 to 4.84 |
| FNO | 4.55 to 5.48 to 7.32 |
| H | −109.84 to −81.40 to −53.62 |
| y | 20.42 |

| Surface number | Radius of curvature | Surface-to-surface distance | Refractive index | Abbe number | | | |
|---|---|---|---|---|---|---|---|
| 0 |  | 2.00 | 1.0 |  |  |  |  |
| 1 | 0.0000 | 3.00 | 1.52428 | 58.80 | (plate glass) | | |
| 2 | 0.0000 | (D2) | 1.0 |  |  |  |  |
| 3 | −700.6386 | 1.20 | 1.77621 | 49.61 | L11 | G1 | |
| 4 | 29.4690 | 4.66 | 1.0 |  |  |  |  |
| 5 | 35.3646 | 3.40 | 1.69416 | 31.16 | L12 |  | |
| 6 | 123.5014 | (D6) | 1.0 |  |  |  |  |
| 7 | 51.2046 | 2.50 | 1.71615 | 53.93 | L21 | G2 | G21 |
| 8 | −91.7016 | 0.10 | 1.0 |  |  |  |  |
| 9 | 24.5180 | 3.50 | 1.49926 | 82.52 | L22 |  | |
| 10 | −69.1590 | 1.29 | 1.0 |  |  |  |  |
| 11 | −47.5651 | 2.56 | 1.74690 | 49.23 | L23 |  | |
| 12 | −23.3009 | 2.00 | 1.75457 | 35.04 |  |  | |
| 13 | 31.9199 | 4.00 | 1.0 |  |  |  |  |
| 14 | 0.0000 | 9.63 | 1.0 | (stop) | S |  | |
| 15 | −674.8982 | 3.00 | 1.80832 | 46.51 | L24 |  | |
| 16 | −34.0458 | 13.15 | 1.0 |  |  |  |  |
| 17 | −18.5119 | 1.50 | 1.65426 | 58.44 | L25 | G22 | |
| 18 | −42.8092 | (D18) | 1.0 |  |  |  |  |
| 19 | 0.0000 | 0.80 | 1.52428 | 58.80 | (plate glass) | | |
| 20 | 0.0000 | 1.20 | 1.0 |  |  |  |  |

Variable Distances

| β | −0.1890 | −0.2500 | −0.3780 |
| D2 | 233.0003 | 238.0426 | 233.1994 |
| D6 | 29.3224 | 14.8953 | 1.8000 |
| D18 | 28.1861 | 37.5707 | 55.5086 |

Condition Corresponding Values f1 = −85.3635
f2 = 38.2279
Bfw = 30.1861
(Bfw was calculated while excluding the protection glass)
f2N = −51.0933
β2w = −0.7070
β2t = −1.4121
f2P = 40.7695
(1) f2/|f1| = 0.454
(2) Bfw/2Y = 0.739
(3) f2N/f1 = 0.599
(4) $(\beta 2t \cdot \beta 2w)^{1/2}$ = 0.997
(5) D/f2 = 0.357
(6) f2P/|f2N| = 0.700
(7) ν1 = 58.44

FIGS. 11A to 13I are graphs showing various aberrations of the third embodiment of the present invention. Figs. 13A to 11 show various aberrations in the maximum wide-angle state, FIGS. 12A to 12I show various aberrations in the intermediate focal length state, and FIGS. 13A to 13I show various aberrations in the maximum telephoto state.

In FIGS. 11A to 13I, in each graph showing a spherical aberration, a solid curve represents the spherical aberration, a dotted curve represents the sine condition, and y is the image height. In each graph showing an astigmatism, a solid curve represents the sagittal image plane, and a broken curve represents the meridional image plane, e is the aberration for the e-line, and g is the aberration for the g-line. In each graph showing a coma, comas at the image height y=0, 10, 14, 17, 20, and 42 are shown, and H is the object height.

As can be seen from these graphs, in this embodiment, various aberrations are satisfactorily corrected, and excellent imaging performance is obtained.

(Fourth Embodiment)

Figure 14:
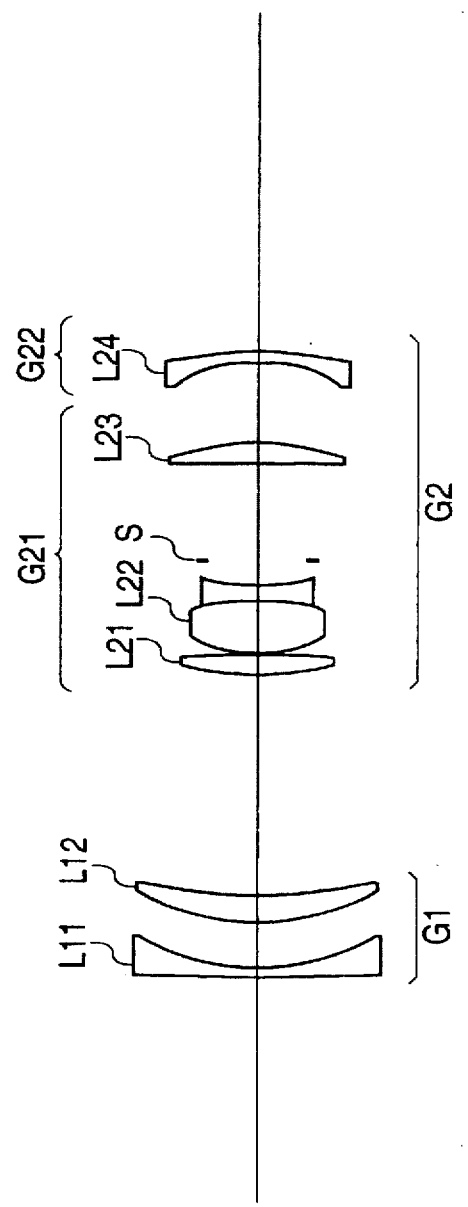
FIG. 14 is a sectional view showing a lens arrangement of the fourth embodiment.

FIG. 14 is a sectional view showing a lens arrangement of the fourth embodiment of the present invention.

The zoom lens of the fourth embodiment comprises, in the following order from the object side, a first lens unit G1 having a negative refractive power as a whole and a second lens unit G2 having a positive refractive power as a whole. The first lens unit G1 comprises, in the following order from the object side, a negative meniscus lens L11 with its concave surface facing the image side and a positive meniscus lens L12 with its convex surface facing the object side.

The second lens unit G2 comprises, in the following order from the object side, a biconvex lens L21, a cemented lens L22 composed of a biconvex lens and a biconcave lens, a positive meniscus lens L23 with its convex surface facing the image side, and a negative meniscus lens L24 with its concave surface facing the object side.

The lenses L21 to L23 form a first lens component G21, arid the lens L24 forms a second lens component L22. In addition, the lenses L21 and L22 constitute a first positive partial component, and the lens L23 constitutes a second positive partial component. A stop S is arranged between the lens L22 and the lens L23.

In the fourth embodiment, a 3-mm thick plate glass member (refractive index for the e-line: 1.52428, and Abbe number: 58.80) is inserted between the object position and the first lens unit in the zooming operation, and a 0.8-mm thick plate glass member is inserted between the second lens unit and the image plane position. These plate glass members are fixed with respect to the image plane and the object plane in the zooming operation (a radius of curvature of 0 means a flat surface).

Table 4 shows numerical data of the fourth embodiment of the present invention. In this table, f is the focal length, FN is the F-number, β is the imaging magnification, FNO is the effective F-number, H is the object height, and y is the image height. The refractive index is a value for the e-line (λ=546.1 nm). Surface number 0 represents the object plane and indicates the distance between the plate glass member and the object plane.

TABLE 4

| β | −0.1790 to −0.2500 to −0.3780 |
| FN | 3.81 to 4.21 to 4.78 |
| FNO | 4.47 to 5.32 to 6.94 |
| H | −108.78 to −81.06 to −53.55 |
| y | 20.42 |

| Surface number | Radius of curvature | Surface-to-surface distance | Refractive index | Abbe number | | |
|---|---|---|---|---|---|---|
| 0 |  | 2.00 | 1.0 |  |  |  |
| 1 | 0.0000 | 3.00 | 1.52428 | 58.80 | (plate glass) | |
| 2 | 0.0000 | (D2) | 1.0 |  |  |  |
| 3 | 217.3806 | 1.20 | 1.80086 | 45.37 | L11 | G1 |
| 4 | 28.4034 | 6.80 | 1.0 |  |  |  |
| 5 | 34.6976 | 3.40 | 1.76168 | 27.53 | L12 |  |
| 6 | 67.6395 | (D6) | 1.0 |  |  |  |

TABLE 4-continued

| | | | | | | |
|---|---|---|---|---|---|---|
| 7 | 51.1099 | 2.80 | 1.77074 | 46.80 | L21 G2 | G21 |
| 8 | −75.1121 | 0.10 | 1.0 | | | |
| 9 | 21.2438 | 6.80 | 1.49926 | 82.52 | L22 | |
| 10 | −38.6473 | 2.00 | 1.80945 | 33.89 | | |
| 11 | 24.6119 | 3.50 | 1.0 | | | |
| 12 | 0.0000 | 12.57 | 1.0 | (stop) | S | |
| 13 | −465.9257 | 2.75 | 1.79192 | 47.47 | L23 | |
| 14 | −31.6905 | 11.00 | 1.0 | | | |
| 15 | −19.5524 | 1.50 | 1.69980 | 55.48 | L24 | G22 |
| 16 | −46.6133 | (D16) | 1.0 | | | |
| 17 | 0.0000 | 0.80 | 1.52428 | 58.80 | (plate glass) | |
| 18 | 0.0000 | 1.20 | 1.0 | | | |

Variable Distances

| | | | |
|---|---|---|---|
| β | −0.1890 | −0.2500 | −0.3780 |
| D2 | 230.2897 | 235.1693 | 230.0000 |
| D6 | 29.7051 | 15.2261 | 2.1000 |
| D18 | 28.5829 | 38.1824 | 56.4779 |

Condition Corresponding Values f1 = −83.4949
f2 = 39.3112
Bfw = 30.5829
(Bfw was calculated while excluding the protection glass)
f2N = −49.2533
β2w = −0.7109
β2t = −1.4205
f2P = 36.4142
(1) f2/|f1| = 0.471
(2) Bfw/2Y = 0.749
(3) f2N/f1 = 0.675
(4) (β2t · β2w)$^{1/2}$ = 1.005
(5) D/f2 = 0.409
(6) f2P/|f2N| = 0.739
(7) ν1 = 55.48

FIGS. 15A to 17I are graphs showing various aberrations of the fourth embodiment of the present invention. FIGS. 15A to 15I show various aberrations in the maximum wide-angle state, FIGS. 16A to 16I show various aberrations in the intermediate focal length state, and FIGS. 17A to 17I show various aberrations in the maximum telephoto state.

In FIGS. 15A to 17I, in each graph showing a spherical aberration, a solid curve represents the spherical aberration, a dotted curve represents the sine condition, and y is the image height. In each graph showing an astigmatism, a solid curve represents the sagittal image plane, and a broken curve represents the meridional image plane, e is the aberration for the e-line, and g is the aberration for the g-line. In each graph showing a coma, comas at the image height y=0, 10, 14, 17, 20, and 42 are shown, and H is the object height.

As can be seen from these graphs, in this embodiment, various aberrations are satisfactorily corrected, and excellent imaging performance is obtained.

Having described preferred embodiments of the present invention, it is to be understood that any variations will occur to those skilled in the art within the scope of the appended claims.

What is claimed is:

1. A variable focal length optical system consisting of, in the following order from an object side, a first lens unit having a negative refractive power and a second lens unit having a positive refractive power, wherein a focal length of an entire lens system changes when a distance between said first lens unit and said second lens unit is changed, and the following condition is satisfied:

$$0.3 < |f2/f1| < 0.5$$

where f1 is the focal length of said first lens unit, and f2 is the focal length of said second lens unit.

2. A system according to claim 1, wherein said first lens unit temporarily moves to an image side and then to the object side, and said second lens unit moves to the object side, thereby changing an imaging magnification while maintaining a predetermined limited object-to-image distance, said second lens unit comprises a first lens component having a positive refractive power and a second lens component arranged on the image side of said first lens component and having a negative refractive power, and the following conditions are satisfied:

$$0.25 < Bfw/2Y < 0.77$$

$$0.4 < f2N/f1 < 1.2$$

where Bfw is the back focus for an object at a predetermined position, which is obtained when the imaging magnification is minimum, 2Y is the diagonal length of a frame, and f2N is the focal length of said second lens component of said second lens unit.

3. A system according to claim 2, when said second lens unit comprises a first positive partial component including at least two positive lenses, and a second positive partial component including at least one positive lens, and an aperture stop is arranged between said first positive partial component and said second positive partial component.

4. A system according to claim 3, wherein the following condition is satisfied:

$$0.9 < (β2t·β2w)^{1/2} < 1.1$$

where β2w is the lateral magnification obtained when the imaging magnification of said second lens unit is minimum, and β2t is the lateral magnification obtained when the imaging magnification of said second lens unit is maximum.

5. A system according to claim 4, wherein the following condition is satisfied:

$$0.1 < D/f2 < 0.5$$

where D is the air gap along an optical axis between a lens surface of said first positive partial component arranged adjacent to said aperture stop to be closest to said object and a lens surface of said second positive partial component arranged adjacent to said aperture stop to be closest to said image.

6. A system according to claim 5, wherein said first lens unit comprises a negative lens and a positive lens in this order from the object side, and said second lens unit has, on the object side of said aperture stop, at least one biconvex lens and a cemented negative lens composed of a positive lens and a negative lens, and on the image side of said aperture stop, at least one positive lens and one negative lens.

7. A system according to claim 1, wherein said second lens unit comprises a first positive partial component including at least two positive lenses and a second positive partial component including at least one positive lens, and an aperture stop is arranged between said first positive partial component and said second positive partial component.

8. A system according to claim 7, wherein the following condition is satisfied:

$$0.9<(\beta_{2t}\cdot\beta_{2w})^{1/2}<1.1$$

where β2w is the lateral magnification obtained when the imaging magnification of said second lens unit is minimum, and β2t is the lateral magnification obtained when the imaging magnification of said second lens unit is maximum.

9. A system according to claim 8, wherein the following condition is satisfied:

$$0.1<D/f2<0.5$$

where D is the air gap along an optical axis between a lens surface of said first positive partial component arranged adjacent to said aperture stop to be closest to said object and a lens surface of said second positive partial component arranged adjacent to said aperture stop to be closest to said image.

10. A system according to claim 9, wherein said first lens unit comprises a negative lens and a positive lens in this order from the object side, and said second lens unit has, on the object side of said aperture stop, at least one biconvex lens and a cemented negative lens composed of a positive lens and a negative lens, and on the image side of said aperture stop, at least one positive lens and one negative lens.

11. A variable focal length optical system comprising, in the following order from an object side, a first lens unit having a negative refractive power and a second lens unit having a positive refractive power, wherein a focal length of an entire lens system changes when a distance between said first lens unit and said second lens unit is changed, said second lens unit comprises a first lens component having a positive refractive power and a second lens component arranged on the image side of said first lens component and having a negative refractive power, an air space that spans a distance between an image-side surface of said first lens component and an object-side surface of said second lens component is stationary during each focal length chance of the entire lens system, and the following conditions are satisfied:

$$0.25<Bfw/2Y<0.77$$

$$0.45<f2P/f2N<0.8$$

where Bfw is the back focus for an object at a predetermined position, which is obtained when an imaging magnification is minimum, 2Y is the diagonal length of a frame, f2P is the focal length of said first lens component of said second lens unit, and f2N is the focal length of said second lens component of said second lens unit.

12. A system according to claim 11, wherein the following condition is satisfied:

$$0.3<f2/f1<0.5$$

where f1 is the focal length of said first lens unit, and f2 is the focal length of said second lens unit.

13. A variable focal length optical system comprising, in the following order from an object side, a first lens unit having a negative refractive power and a second lens unit having a positive refractive power, wherein a focal length of an entire lens system changes when a distance between said first lens unit and said second lens unit is changed, said first lens unit has a negative lens and a positive lens arranged on an image side of said negative lens, an aperture stop is arranged in said second lens unit, and said second lens unit consists of, on the object side of said aperture stop, one biconvex lens and a cemented negative lens composed of a positive lens and a negative lens, and on the image side of said aperture stop, one positive lens and one negative lens.

14. A system according to claim 13, wherein the following condition is satisfied:

$$v1>45$$

where v1 is the Abbe number of a negative lens arranged in said second lens unit to be closest to an image plane.

15. A variable focal length optical system capable of changing an imaging magnification while maintaining a predetermined limited object-to-image distance, comprising:

a first lens unit having a negative refractive power and a second lens unit having a positive refractive power, wherein said first lens unit comprises, in the following order from an object side, a negative lens with a concave surface facing an image side, and a positive lens having a convex surface facing the object side, and said second lens unit consists of, in the following order from the object side, a biconvex lens, a meniscus shaped cemented lens composed of a positive lens and a negative lens, an aperture stop, a negative lens, a positive lens with a convex surface facing the image side, a positive meniscus shaped lens with a convex surface facing the image side, and a negative lens with a concave surface facing the object side.

16. A system according to claim 15, wherein the following condition is satisfied:

$$0.3<f2/f1<0.5$$

where f1 is the focal length of said first lens unit, and f2 is the focal length of said second lens unit.

* * * * *